CORE-TESTING FIXTURE

Filed Aug. 9, 1954

RAYMOND STUART-WILLIAMS
INVENTOR.

BY Lyon & Lyon
ATTORNEYS

United States Patent Office 2,817,809
Patented Dec. 24, 1957

2,817,809

CORE-TESTING FIXTURE

Raymond Stuart-Williams, Pacific Palisades, Calif., assignor, by mesne assignments, to Telemeter Magnetics and Electronics Corporation, Los Angeles, Calif., a corporation of New York Application August 9, 1954, Serial No. 448,604

6 Claims. (Cl. 324—34)

This invention relates to test equipment and, more particularly, to an improvement in apparatus for testing toroidal magnetic cores.

A description of the toroidal magnetic cores of the type for which the present invention is employed may be found in an article in the October 1953 issue of the Proceedings of the IRE, page 1407. The article is entitled A Myriabit Magnetic-Core Matrix Memory by Jan A. Rajchman. Magnetic-core memories employ a considerable number of cores. A magnetic-core memory as is found described in the article usually consists of a plurality of cores arranged in rows and columns. A separate coil links all the cores in each column. A separate coil links all the cores in each row. In order to drive a core from a positive to a negative state of magnetic saturation, each coil which is coupled to the desired core receives half the current required to turn over the core. The one core coupled to both coils thereby receives the sum and is driven. The other cores receive only half the required excitation and are not so driven. The condition of a core in the memory is read by using a common reading coil which is coupled to all the cores. Any core which is selected receives a drive in only one of the directions of saturation. Therefore, if a voltage is induced in the reading coil, it is known that the core was saturated with the opposite polarity. If no voltage is induced in the reading coil, then it is known that the selected core was in the same polarity as it was being driven by the two coils.

It will be appreciated that in order to successfully drive a single core in a large matrix, such as the 10,000-bit matrix described in the article, using a coincident drive and without disturbing any of the other cores in the memory, the current in a column or a row coil must be less than that required to turn over a core. The cores in a memory must therefore have their characteristics substantially uniform, since driving currents for reading or writing purposes cannot be increased or decreased to suit cores with different coercive forces. The complexity which would be involved in driving a 10,000-bit memory wherein the cores are not substantially the same will be readily appreciated.

The requirement for uniformity in core characteristics is still greater when the difficulties in reading the cores are considered. Although the half drives in the column and row coils are less than are required to turn over any core, the cores which are not selected are driven around minor hysteresis loops, thereby inducing voltages into the reading coil. These voltages can become sufficiently large to mask the output from a core being read.

A large order of cancellation of these voltages is achieved by "checkerboarding" the reading winding, that is, the sense of the reading coil on the various cores is periodically reversed. This also requires the cores to be substantially uniform. Otherwise, with differing voltages being induced from the half-driven cores, substantial cancellation is impossible to achieve.

To select cores for a memory having uniform characteristics, every one of the cores must be put through a series of electrical tests. Heretofore, in view of the small size of the cores, no successful automatic method of testing was available. The cores were manually mounted on a fixture and tested. The cores, as may be seen from the pictures in the previously referred to article, are so small as to make manual handling difficult.

In order to overcome the difficult and time-consuming operation of manually testing the thousands of cores required, an automatic core tester was developed. This is shown in the article. This core tester aligned cores to be tested in a single column. At one end of this column of cores a wheel was positioned. The wheel had pin-like structures extending outwardly at four positions around the wheel. The positioning of this wheel is made so that each one of these points or needles, in passing by the column of cores, picks up a core by passing the needle through the opening in the core. The wheel is rotated past spring contacts. These contacts touch the pin and the wheel at positions on either side of the core. These spring contacts extend in an arc over a portion of the periphery of the wheel. Accordingly, a program of test pulses can be applied to the core while it is traveling between the spring contacts and the voltages induced. As a result, those test pulses can be detected by the spring contacts employed for that purpose. By the time the core reaches the end of the path covered by the contacts, a determination has been made whether or not the core is acceptable. If it is acceptable, it is made to fall into one position and, if not, into a second position. A picture of this automatic core tester, as well as a brief description thereof, will be found in the article previously mentioned, pages 1410 through 1411.

The test currents are usually current pulses of one or two microseconds' duration. In the automatic core tester shown in the article, there is a common path traveled by the test currents and reading coil currents which is substantial. It extends from the contacts on one side of the pin through the pin and wheel to the contacts on the other side of the wheel. Difficulty in obtaining accurate or repeatable results with this setup ensued. The test current causes modulation effects on the reading current which can effectively prevent a true determination of the core characteristics. In order to have as small cross-modulation effects as possible between the test current and the current resulting from the induced voltage of a core under test, it is desirable to have the common path traveled by the test current and the reading current as short as possible. Furthermore, current had to pass from pin to wheel. A voltage drop occurred here which, in view of the order of magnitude of the voltages being dealt with, was a substantial factor in providing erroneous results.

An object of this invention is to provide an automatic core-testing device wherein the core-testing pin or fixture and contact arrangement are arranged to provide a common test and reading current path having a minimal length.

Another difficulty which occurs with the automatic core-testing equipment is that the pins wear out fairly rapidly as a result of the pressure of the contact wires.

A further object of the present invention is to provide a structure permitting ready replacement of pin fixtures.

Still another object of the present invention is to provide a pin fixture which is cheaper and easier to manufacture than the previously known and used fixtures.

Yet another object of the present invention is to provide a novel, useful, and improved pin fixture.

These and other objects of the invention are achieved by providing a pin fixture wherein the testing-current and reading-current contact wires are positioned on opposite sides of the pin fixture. The reading current contact wires are positioned as close to provide as short a common current path as can be physically made possible, and, further, the pins are made of wire stock instead of metal stock, which has to be shaped and cut to size on a lathe.

The novel features that are considered characteristic of this invention are set forth with particularity in the appended claims. The invention, itself, both as to its organization and method of operation, as well as additional objects and advantages thereof, will best be understood from the following description when read in connection with the accompanying drawings, in which:

Figure 1:
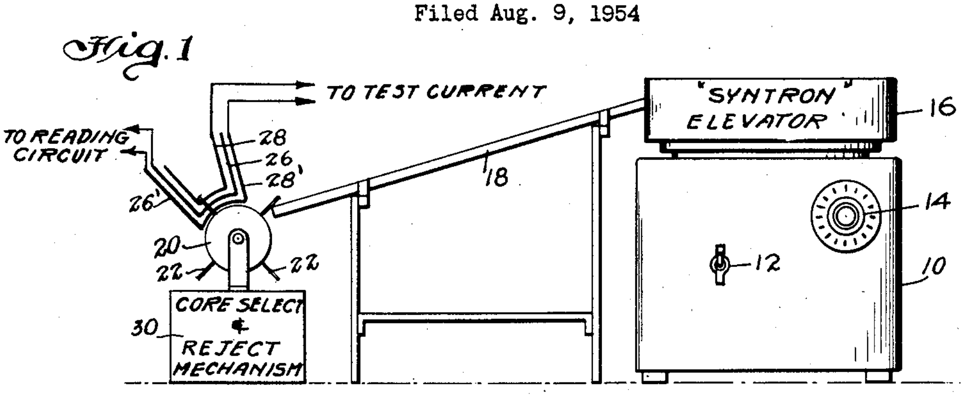
Figure 1 is a schematic diagram showing the general layout of an automatic core-testing machine with contact wires in position in accordance with an embodiment of the invention.

Referring now to Figure 1, there is seen a schematic drawing of the presently known magnetic core test set. This includes a syntron elevator 10 which is a commercially purchasable article. The driving mechanism includes a power-control switch 12 and a vibrator-amplitude control 14. On top of this is what may be described as a shallow pot 16, which is rapidly vibrated with a small rotary movement. The outside edge of the inside of the pot has a spiral track (not shown) which is slightly larger than one magnetic core in width. This track spirals up to the exit point, wherein there is a ramp 18. As the pot is vibrated, the cores which are deposited therein are moved to the outside of the pot and around and up the spiral track in single file to the exit ramp. The ramp also is only slightly in excess of the width of a core, so that the cores are lined up in a column or in single file on the ramp. The lower edge of the ramp is slotted (not shown). A wheel 20 with four pin fixtures 22 rotates in a direction so that the pins come up through the slot in the ramp and pick off a single toroidal core 24. As thus far described, the arrangement of the core test set is known. The arrangement of the wire contacts 26, 26′, 28, 28′ to be described is novel, however, and is a feature of this invention. Two sets of coextensive wire contacts are provided. One set 26, 26′ is used to pick off reading voltages induced therein when the core is driven by current applied to the other set of wire contacts 28, 28′. A core on the pin is pushed toward the base of the pin by the reading wire contacts 26, which also serve to contact the pin on either side to insure a good contact. Test-current wire contacts 28, 28′ are also provided which are coextensive with the reading wire contacts 26, 26′. While the pin passes between the contact wires, the core undergoes a series of tests to determine its characteristics. If it is acceptable, it is dropped into one container, and, if it is not acceptable, it is dropped into a second container. The operation of the reject and select mechanism 30 is of no concern here, and, therefore, will not be described in detail.

Figures 2, 3, 4:
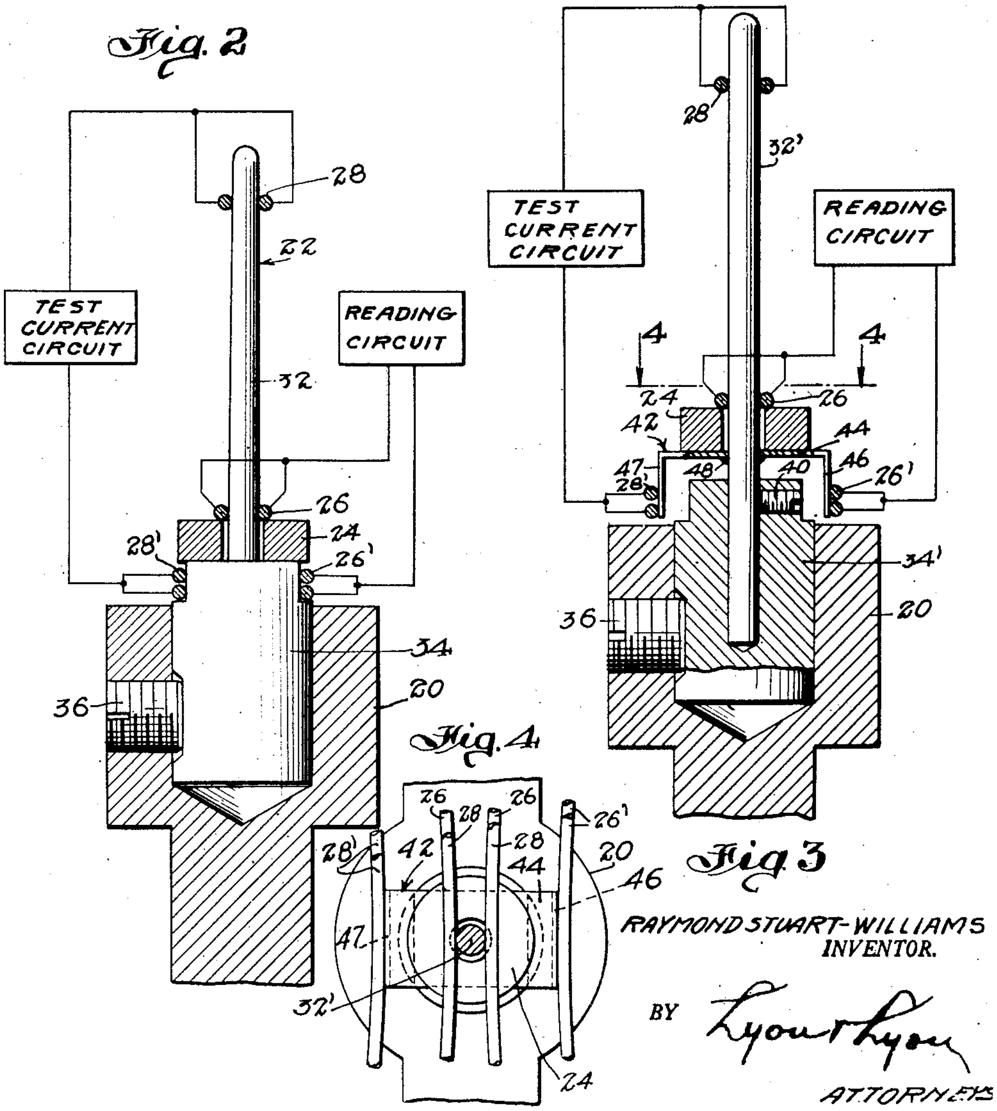
Figure 2 is a view partially in section which shows the pin fixture and contact wires, which is one embodiment of the invention.
Figure 3 is a view partially in section which shows a pin fixture and contact wires, which is a second embodiment of the invention.
Figure 4 is a top view of the arrangement shown in Figure 3.

Referring now to Figure 2, a detailed drawing of one embodiment of the invention herein is shown. This consists of the pin fixture 22, including a pin 32 and boss 34 made from a single piece of round stock. The reason for making this from a single piece is to eliminate any voltage drops due to junctions between material. The wheel 20, which is shown in section, is drilled to receive the boss 34 and to hold it with a set screw 36 which permits the ready removal of the pin and boss. The test circuit current is applied to the pin 32 between the boss and the outer end of the pin. The reading circuit obtains the sample current from the contacts 26, 26′, which are extremely close together. As a matter of fact, the positioning of the reading-wire contact 26 is substantially the thickness of a core away from the boss. Thus the portion of the path of the currents which is common is substantially that of the core thickness. This is certainly an almost irreducible minimum. The other reading-wire contact 26′ is positioned on the opposite side from the test current contact 28′. This insures that the path of the reading current through the pin separates from the test current path as soon as possible. Since the currents exist on the order of microseconds, there are skin effects present. Thus the placing of the reading current contacts close together and opposite from the test-current contacts substantially physically isolates the path of the reading current from the path of the test-circuit current. Arranging the contacts in this manner, instead of in the manner shown in the picture of the automatic core tester in the above-noted article, serves the purpose of isolating the two current paths and thus creating a core-test fixture wherein the characteristics of the cores can be read reliably.

Referring now to Figure 3, there is shown a second embodiment of the invention. It will be appreciated that money and time are required to cut and shape a core-test fixture of the type shown in Figure 2. The metal piece must be shaped on a lathe to provide the boss and pin sections. In the second embodiment of the invention, the boss 34′ (shown in section) is mounted in the wheel by a set screw 36, as before. The boss, however, is hollow, to receive a separate pin 32′ which is made from wire stock cut to size. A small set screw 40 is inserted in the boss and is used to fasten the pin into the boss.

A member 42 consisting of a flat portion 44 and two flanges 46, 47 which are opposite each other and are at right angles to the flat portion are soldered to the pin by means of solder 48 at a position just above where the pin fits into the boss. The solder provides a minimal resistance connection. The test circuit contacts 28, 28′ and reading-circuit contacts 26, 26′ are positioned as previously described to physically separate the currents flowing through the core center. The core is picked up by the pin and pushed against the flat member 42 by reading circuit contacts 26. The flange 46 on the flat member is used to provide a contacting surface for the other reading-circuit contact 26′. The flange 47 is used to provide a contacting surface for the other test circuit contact 28′. It is interesting to note that the reading current is very small, so that once the path of the reading and test currents is physically separated, as is insured by the circular member, the contact 26′ can be positioned at any point on the flange. Voltage drops occasioned by an increased resistance of the longer current path is so minimal as to be of no consequence. With this arrangement, the wheel doesn't wear out as previously would happen, but only the pin and the wire contacts, which are cheap, simple, and easily replaceable items.

Figure 4 shows a view in elevation of the arrangement of the test-circuit contacts and reading-circuit contacts. As seen, the lower contacts 26′, 28′ are on opposite sides of the test fixture and, thereby, the currents flowing through the pin are physically separated.

Accordingly, there has been shown herein a novel and useful arrangement of contacts and test fixtures which permit the rapid and accurate testing of cores used for magnetic memories.

I claim:

1. In a magnetic toroidal core-testing machine a fixture for codes under test including a pin, a boss attached to one end of said pin, said pin having a diameter sufficiently small to enable insertion into the opening of a test core, said boss being larger than said test core opening, first contact means to apply current during a period of test to one side of said pin, and second contact means to derive an induced voltage from a core under test from the other side of said pin, said second contact means being spaced apart a distance substantially equal to the thickness of a core.

2. In a magnetic toroidal core-testing machine a fixture for holding cores under test including a pin, a boss at one end of said pin, said pin having a diameter sufficiently small to enable insertion into the opening of a test core, said boss being larger than said test core opening, a pair of current contacts, a pair of reading contacts, means to bring said pin and boss in contact with said pairs of contacts during a period of testing a core, means during said period to position one of said pair of reading contacts in contact with said pin at a distance from said boss on the order of the diameter of a core under test, means to position said other of said pair of reading contacts during said period in contact with one side of said boss, means during said period to position one of said pair of current contacts in contact with said pin at a distance along said pin from said one of said pair of reading contacts, and means during said period to position said other of said pair of current contacts to be in contact with the other side of said boss.

3. In a magnetic toroidal core testing machine a fixture for cores under test including a pin having a diameter sufficiently small to enable insertion through the opening of a core under test, a boss having an opening into which one end of said pin is removably inserted, a member having a flat portion and a flange at one side at right angles to said flat portion, means joining said flat portion to said pin proximal to said boss, a pair of test-current contacts, a pair of reading-current contacts, means to position one of said test-current contacts and one of said reading-current contacts to contact said pin, means to position the other of said reading-current contacts to contact said flange, and means to position the other of said test current contacts at a position opposite to that of said flange.

4. In a magnetic toroidal core-testing machine, a fixture for cores under test including a pin having a diameter sufficiently small to enable insertion through the opening of a core under test, a boss, one end of said pin being inserted into said boss, a contact plate comprising a flat member having a pair of opposite flanges extending at right angles from said plate, said flat member being joined to said pin proximal to said boss, means to apply current during a period of test between a position on said pin and one of said flanges, and means to derive the voltage induced from a core under test from between a position on said pin at a distance from said flat member substantially equal to the thickness of a core and the other of said flanges.

5. In a magnetic toroidal core-testing device of the type having a nonmagnetic wheel and test fixtures spaced around the periphery of the wheel to be rotatable therewith, each of said test fixtures comprising a boss mounted in said wheel, a pin extending from said boss, said pin having a diameter sufficiently small to pass through the opening in a toroidal core, a pair of current contacts, a pair of reading contacts, said both pairs of contacts being mounted to be coupled to a pin during a portion of its path of motion, one of said pair of reading contacts comprising parallel wires spaced sufficiently close to be in contact with a pin passing therethrough, the other of said pair of reading contacts being positioned to contact one side of said boss, one of said pair of current contacts also comprising spaced parallel wires spaced sufficiently close to be in contact with a pin passing therethrough, the other of said pair of current contacts being positioned to contact the other side of said boss.

6. In a magnetic toroidal core-testing device of the type having a nonmagnetic wheel and test fixtures spaced around the wheel periphery to be rotatable therewith, each of said test fixtures comprising a boss mounted in said wheel, a pin removably mounted in said boss, said pin having a diameter sufficiently small to pass through the opening in a toroidal core, a flat member having two opposed substantially right-angle flanges, said flat member being mounted on said pin proximal to said boss, said flanges extending alongside of said boss, a pair of current contacts, a pair of reading contacts, said both pairs of contacts being mounted to be coupled to a pin during a portion of its path of motion, one of said pair of current contacts comprising parallel wires spaced sufficiently close to be in contact with a pin passing therethrough, the other of said pair of current contacts being in contact with one of said flanges, one of said pairs of reading contacts comprising a pair of parallel wires spaced sufficiently close to be in contact with a pin passing therethrough, said pair of contacts being spaced substantially the thickness of a core away from said flat member, the other of said pair of reading contacts being positioned to be in contact with the other of said two flanges.

References Cited in the file of this patent

UNITED STATES PATENTS

| | | |
|---|---|---|
| 1,570,948 | Crouch | Jan. 26, 1926 |
| 2,679,025 | Rajchman et al. | May 18, 1954 |